HYDRAULICALLY-OPERATED SEWER CLEANING MACHINE

Original Filed Nov. 4, 1966 6 Sheets-Sheet 1

INVENTOR.
BURTON L. SIEGAL
BY Norman S. Siegel

HYDRAULICALLY-OPERATED SEWER CLEANING MACHINE

Original Filed Nov. 4, 1966 6 Sheets-Sheet 2

INVENTOR
BURTON L SIEGAL
BY Herman Kersch

HYDRAULICALLY-OPERATED SEWER CLEANING MACHINE

Original Filed Nov. 4, 1966 6 Sheets-Sheet 3

INVENTOR
BURTON L. SIEGAL
BY

HYDRAULICALLY-OPERATED SEWER CLEANING MACHINE

Original Filed Nov. 4, 1966 6 Sheets-Sheet 4

INVENTOR.
BURTON L. SIEGAL
BY Norman H. Geiler

HYDRAULICALLY-OPERATED SEWER CLEANING MACHINE

Original Filed Nov. 4, 1966 6 Sheets-Sheet 5

INVENTOR
BURTON L. SIEGAL
BY Norman F. Oblon

HYDRAULICALLY-OPERATED SEWER CLEANING MACHINE

Original Filed Nov. 4, 1966 6 Sheets-Sheet 6

INVENTOR.
BURTON L. SIEGAL
BY Norman Fiedler

United States Patent Office

Re. 26,659
Reissued Sept. 9, 1969

26,659
HYDRAULICALLY-OPERATED SEWER CLEANING MACHINE

Burton L. Siegal, Chicago, Ill., assignor to O'Brien Manufacturing Corporation, Chicago, Ill., a corporation of Illinois Original No. 3,394,422, dated July 30, 1968, Ser. No. 592,132, Nov. 4, 1966. Application for reissue Oct. 15, 1968, Ser. No. 769,450
Int. Cl. F28g *3/00*
U.S. Cl. 15—104.3 10 Claims

Matter enclosed in heavy brackets [ ] appears in the original patent but forms no part of this reissue specification; matter printed in italics indicates the additions made by reissue.

*ABSTRACT OF THE DISCLOSURE*

*A sewer cleaning machine for feeding and retracting a rotating sewer rod into and from a sewer pipe. The rotational movements of the rod and its longitudinal movements are controlled by interrelation compound differential drive units, each of which embodies a differential input supplied by a motor of the hydraulic type.*

The present invention relates generally to sewer cleaning machines and has particular reference to that type of sewer cleaning machine which is commonly referred to as a "sewer rodder" and embodies reversible power-actuated means for feeding a continuous elongated flexible steel sewer cleaning rod into a sewer pipe and then retracting it from the pipe after cleaning of the latter. Such a sewer cleaning rod, although it may not exhibit marked flexibility when a short length thereof is considered, is, as a whole, of such flexibility that it will not only follow the contour of a sewer pipe but also may be coiled or reeled for storage either in or out of the machine with which it is associated and utilized. The rod is put to use by pushing it into or pulling it from a sewer pipe to be cleaned while at the same time effecting rotation of the rod so that a boring or other sewer-penetrating tool which is affixed to the leading end of the rod may become effective within the sewer pipe to loosen the accumulated sewer material and thus pave the way for further sewer cleaning operations.

Sewer cleaning machines of this general type are fairly well standardized and there is currently upon the market a machine in the form of a wheel-equipped vehicle in which a comparatively great length of continuous sewer cleaning rod is normally stored in a coiled condition within a rotatable basket-like cage. The rod is capable of being fed from or returned to the cage while the latter is rotated and the rotation of the cage is relied upon to effect the necessary rod rotation during sewer cleaning operations while the rod is either being pushed into or pulled from the sewer pipe undergoing cleaning. A reversible drive unit is employed to effect longitudinal movement of the sewer cleaning rod and this drive unit embodies one or more pairs of mating grooved traction feed wheels which engage the rod therebetween for rod-impelling purposes in either direction and which not only rotate about their own respective axes, but also rotate or orbit bodily about the axis of the sewer rod undergoing feeding.

Sewer cleaning machines which are constructed upon the principles briefly set forth above are possessed of numerous limitations, both of design and of operation. For example, considerable difficulty is encountered in constructing a machine in which the controlled rotation of the feed rollers about their respective axes of rotation for sewer rod-driving purposes, and also controlled rotation or orbital movement of these feed rollers about the longitudinal axis of the sewer rod can be effected efficiently. Heretofore, structures have been devised wherein separate drive motors have been employed for these purposes, the motor which drives the feed rolls being mounted on the feed roll head and thus being rotatable bodily therewith. This has necessitated the use of rotary slip couplings and the like for supplying power to the motor.

The present invention is designed to overcome many of the limitations that are attendant upon the construction and operation of present-day sewer cleaning machines, and toward this end, the invention contemplates the provision of a novel hydraulically-operable machine which employs stationary hydraulic components which serve selectively or in a controlled manner to actuate a novel compound differential mechanism by means of which the rate of rotation of the rod-storage cage and the rate of linear feed of the sewer cleaning rod are capable of being correlated with infinite differential adjustment as between conditions of maximum rod feed in either direction and no rod feed; and conditions of maximum basket rotational speed in either direction and no basket rotation, each adjustment for rod feed being independent of the rate of basket rotation and vice versa. Still further, the invention contemplates the provision of novel hydraulic control facilities for such differential mechanism whereby the operator, by manipulating a single operating lever, is enabled to effect the desired differential adjustments.

The provision of a sewer cleaning machine of the character briefly outlined above constitutes the principal object of the present invention. Other ancillary objects and many advantages of the present invention cannot be stated at this time with sufficient clarity for a full appreciation thereof until the specific nature of the invention is better understood. However, a few of the novel features of the present invention upon which such objects or advantages are based reside in the provision of a differential mechanism which is so designed that one of the rotatable input elements thereof may be employed for power take-off purposes in such a manner that it may be caused to operate a stationary mechanical counter which is calibrated for footage readings to indicate the precise linear extent of rod feed at any given movement during feeding of the sewer cleaning rod into or out of the sewer pipe.

With these and other objects and advantages in view, which will become more readily apparent as the following description ensues, the invention consists in the novel constructions, combinations, and arrangements of parts shown in the accompanying six sheets of drawings forming a part of this specification.

GENERAL CONSIDERATIONS

Figure 1:
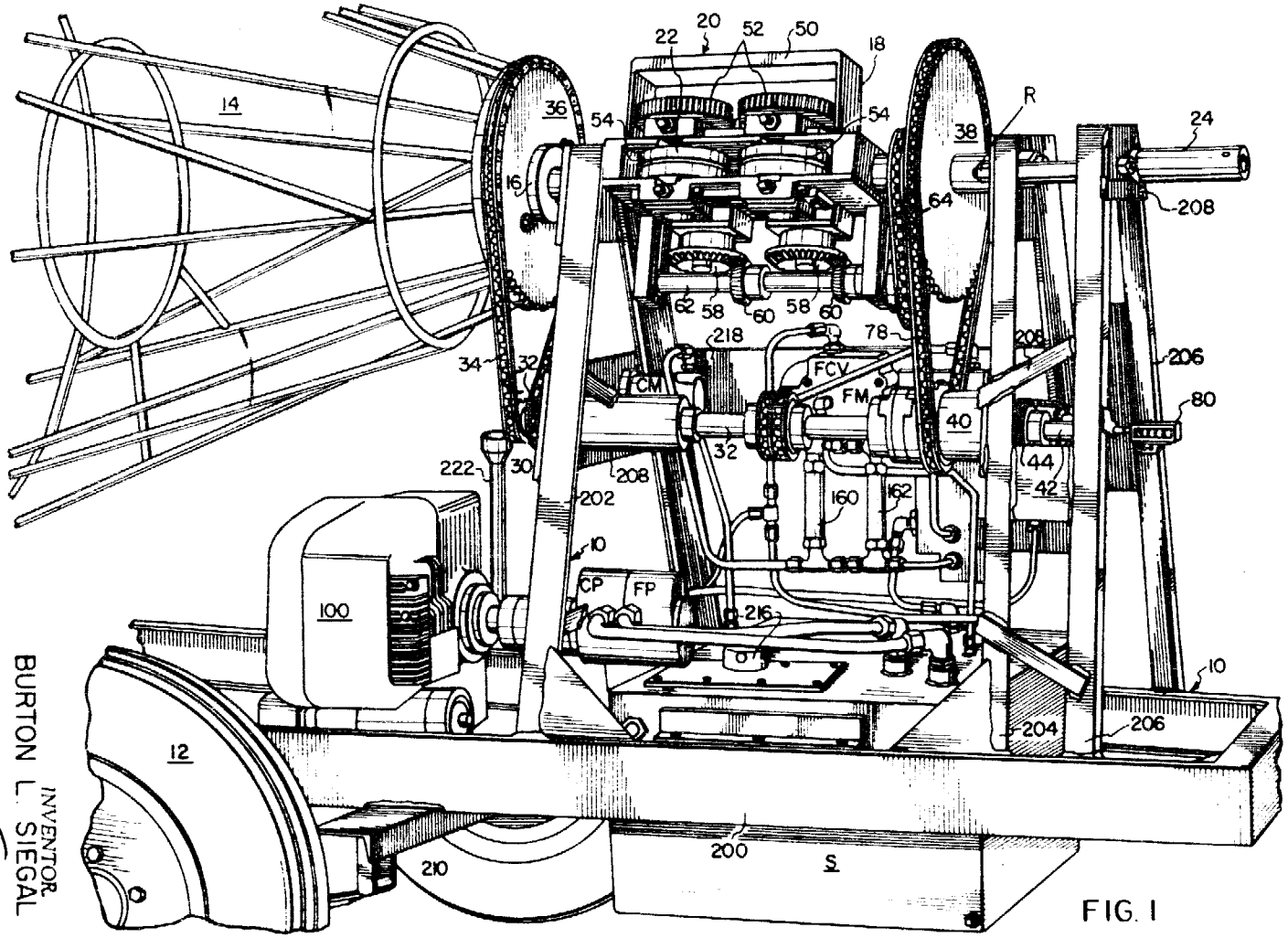
FIG. 1 is a fragmentary side perspective view of a sewer cleaning machine embodying the particular hydraulically-operated control mechanism of the present invention.
Figure 2:
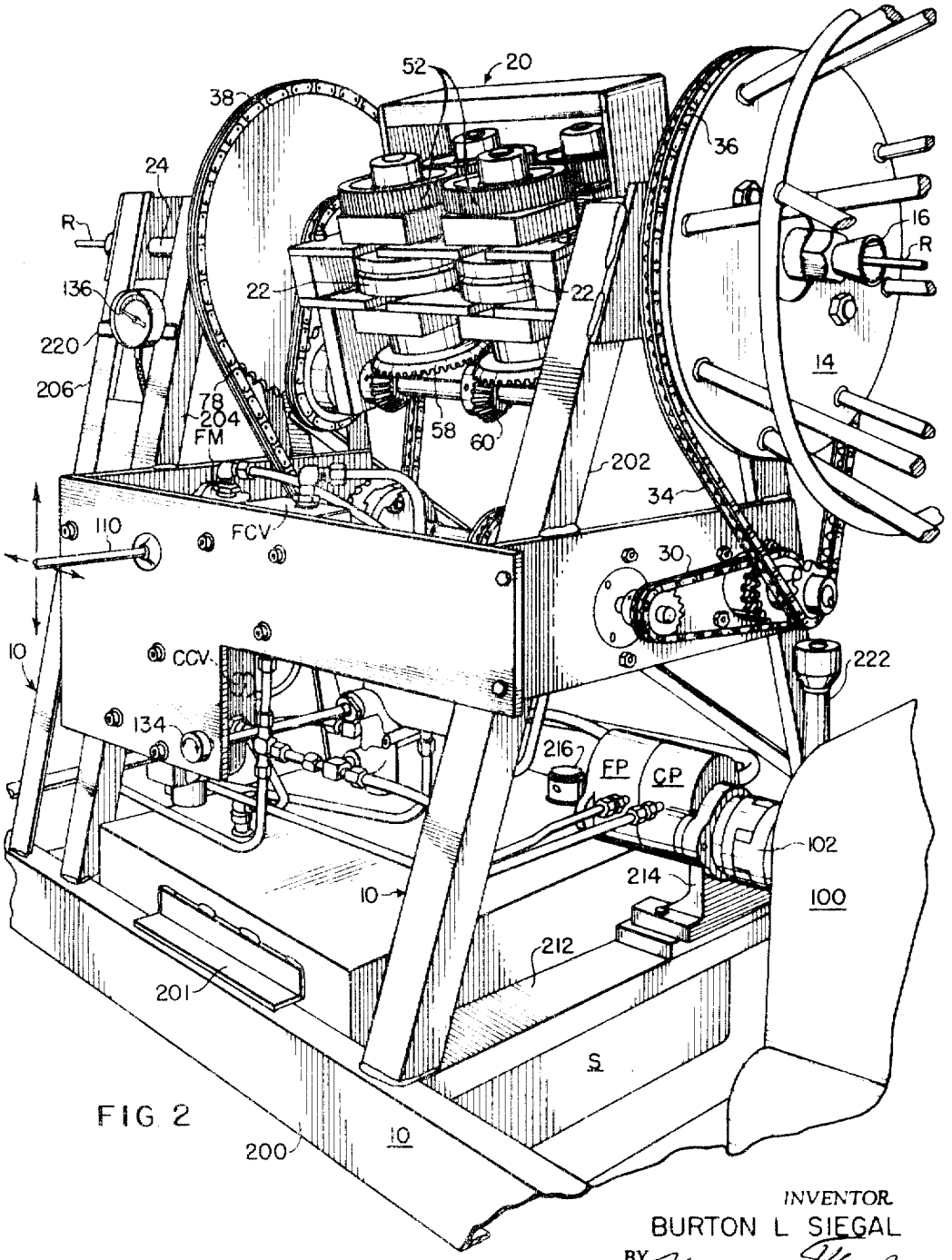
FIG. 2 is a fragmentary rear perspective view of the structure of FIG. 1.

Referring now to the drawings in detail and in particular to FIGS. 1 and 2, the hydraulically-operable control mechanism of the present invention is shown as being operatively installed in a sewer cleaning machine of the general type which is shown and described in my copending United States patent application Ser. No. 524,383, filed on Feb. 2, 1966, and now Patent No. 3,293,681, and entitled "Sewer Cleaning Machine," and resembles the same, both in outward appearance and in chassis frame structure. Furthermore, the herein illustrated machine is intended for the same purpose and functions in the field to clean sewers in the same general manner, i.e., by thrusting an elongated sewer cleaning rod with the usual bullet-nosed boring tool attached to its forward end forwardly by a pushing action through a sewer pipe thereof, and thereafter, retracting the rod by a pulling action with the usual cutter or drag attached thereto. The present sewer cleaning machine differs, however, from the machine of said patent application in that it operates upon a continuous unjointed sewer cleaning rod instead of upon a sectional rod in which the rod sections are connected together in end-to-end fashion by intervening coupling members. Both machines are in the form of a trailer vehicle having a power-driven, backet-like storage reel or cage from which a comparatively great length of flexible sewer cleaning rod may be payed out to a sewer pipe undergoing cleaning or retracted back into the cage, means being provided whereby the cage may be rotated if desired during feeding or retraction of the rod so that the latter may rotate within the sewer pipe undergoing treatment. The function of the present hydraulically-operable control mechanism is to effect axial shifting of the rod in either direction, with or without rotation as desired, while at the same time allowing for rotation of the rod. As previously pointed out, a machine of this type is commonly referred to as a "sewer rodder." Although the invention is specifically illustrated and described in connection with a sewer rodder of the trailer vehicle type, the present hydraulically-operable control mechanism is equally applicable to other types of sewer rodders, such, for example, as sewer rodders which are embodied in self-propelled or tractor-type vehicles. Irrespective, however, of the particular environment with which the present hydraulically-operable control mechanism may be associated, the essential features of the invention are at all times preserved.

Briefly, the trailer vehicle with which the present control mechanism is associated involves in its general organization a chassis or framework 10, the rear end of which is supported by means of wheels 12 and the front end of which is provided with the usual attaching means or hitch (not shown) whereby the vehicle as a whole may be attached to and drawn by a tractor or other propelling vehicle. The trailer vehicle is fragmentarily shown herein, only such details as bear a relationship to the rod storing and driving mechanism and its associated hydraulic control instrumentalities being illustrated. At the rear end of the vehicle framework 10, there is disposed a relatively large and generally furstoconical storage reel or cage 14, the large base of which faces rearwardly. The small base or forward end of the cage 14 carries a funnel 16 which serves as a support for such end of the cage, the funnel being rotatably carried in bearings (not shown) at the upper end of a fixed or rigid standard 18 on the framework 10.

The cage 14 is adapted to receive therein in coiled fashion the sewer cleaning rod R which is associated with the machine, the rod being of comparatively great extent and consisting of a continuous length of flexible steel rod stock. The term "flexible" is applicable to the sewer cleaning rod R only when an appreciable length thereof is considered. Short lengths or sections of the rod are relatively rigid but they are capable of such limited flexing that the rod as a whole is sufficiently flexible to enable it to become coiled in both helical and involute fashion within the rear region of the cage 14. Such coiling of the rod R takes place automatically and progressively as the sewer rod is fed backwards by the hereinafter described rod feeding mechanism of the machine and into the cage through the funnel 16. When the coiled rod R is fed forwardly, the sewer cleaning rod R becomes progressively uncoiled as it is payed out for introduction into the particular sewer pipe undergoing cleaning or other treatment.

Figure 3:
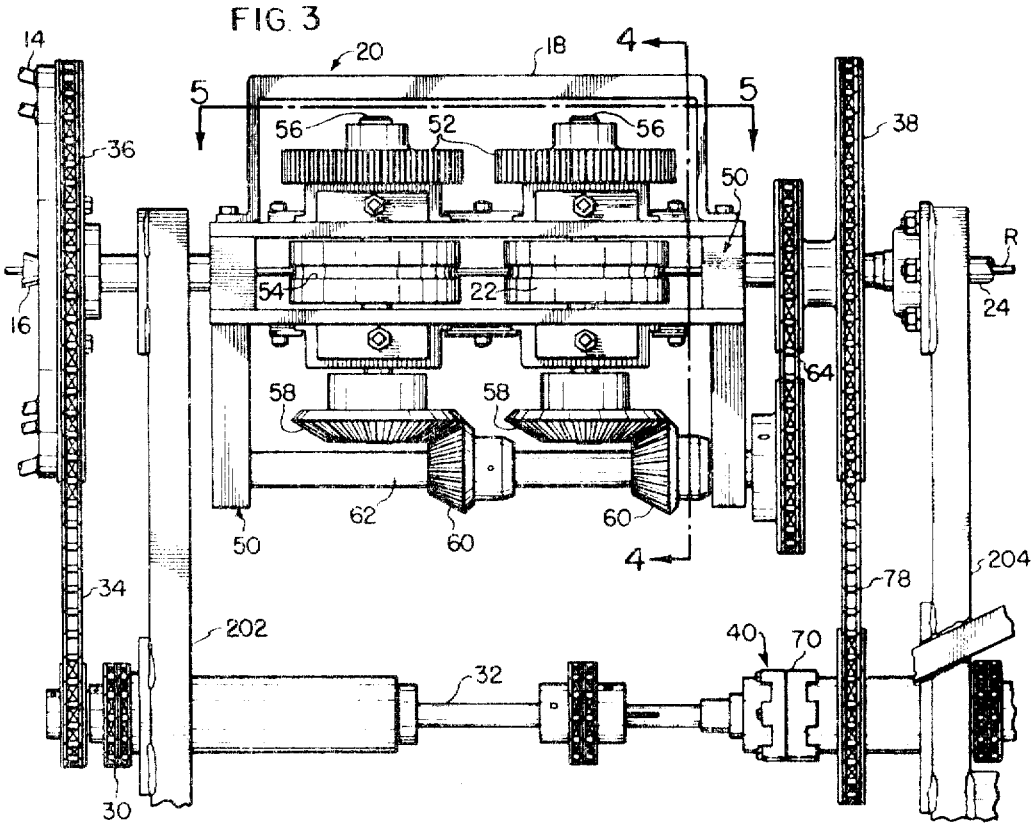
FIG. 3 is an enlarged fragmentary side elevational view of a portion of the structure of FIGS. 1 and 2, the view being taken in the vicinity of a rotatable rod drive differential mechanism or unit that is employed in connection with the present invention.

As is customary in connection with sewer cleaning machines of the type or character under consideration, a suitable boring or reaming tool is applied to the leading end of the sewer rod for entry into the sewer pipe undergoing treatment. This tool, together with the portion of the rod which has been payed out from the cage 14 is adapted to be rotated about its axis such rotation being accomplished by effecting continuous rotation of the cage 16 in one direction. Axial impelling of the rod R for forward feeding and rearward retraction thereof is accomplished by means of a differential traction head assembly 20 through which the rod passes and which is rotatable in unison with the rod R and cage 14. This assembly includes two pairs of opposed peripherally groove traction feed wheels 22 (see FIG. 3) which engage the rod therebetween and draw the same directly from the funnel 16, while at the same time impelling the rod forwardly so as to eject the same through a throat piece 24 during paying-out operations. During rod retracting operations, the feed wheels 22 reverse their rotation and tractionally impel the rod R rearwardly so as to feed the same back through the funnel 16 and into the cage where it becomes automatically coiled for storage within the rear region of the cage.

MECHANICAL POWER APPLICATION

Cage and rod rotation

Figure 7:
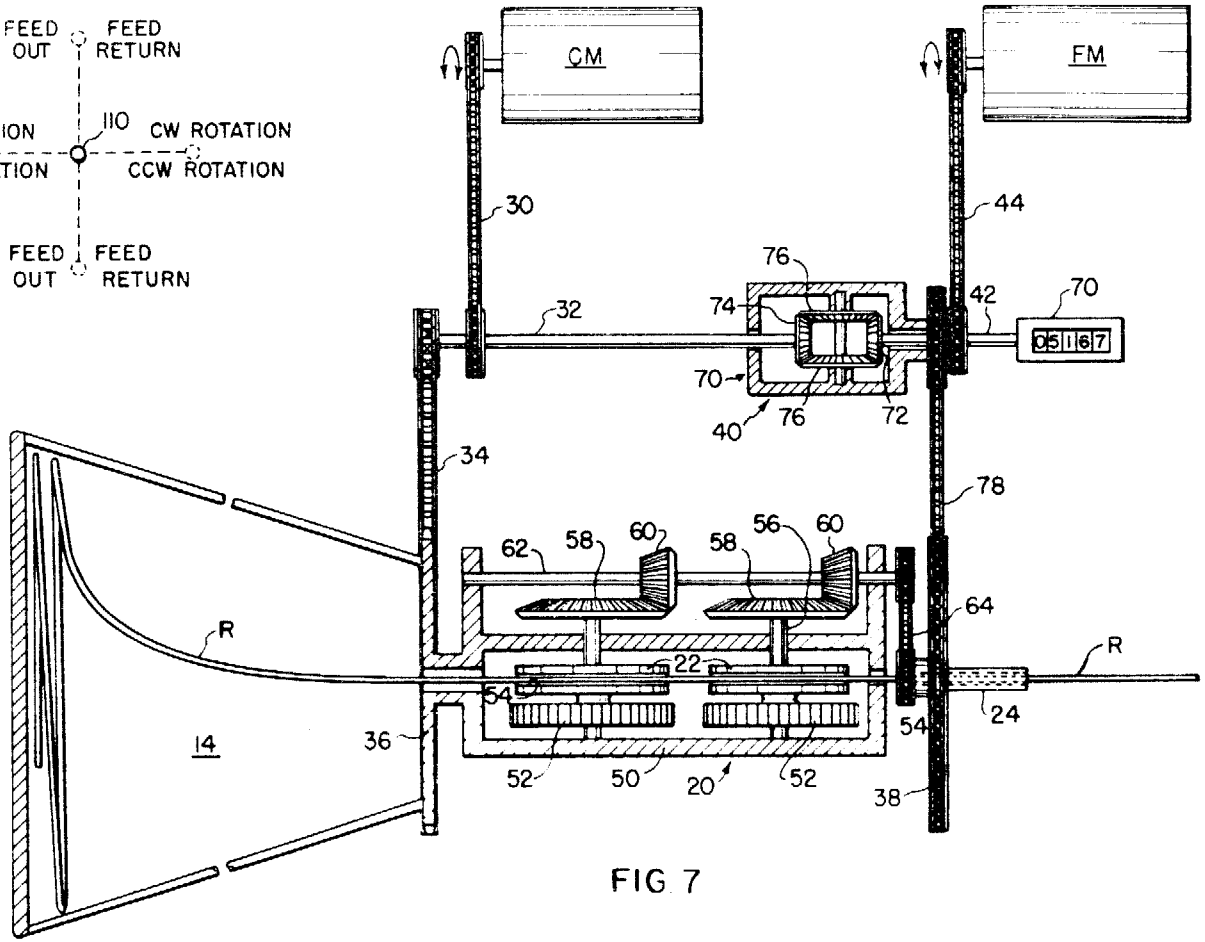
FIG. 7 is a schematic view illustrating certain mechanical power trains and their associated differential mechanisms and by means of which selective and reversible rod-feeding operations may be accomplished.

Cage rotation in either direction is effected through a power train which is schematically portrayed in FIG. 7 of the drawings in a simplified arrangement wherein an hydraulic cage motor CM is connected by a chain and sprocket connection 30 to a horizontal jack shaft 32 which, in turn, is connected to the cage 14 and traction head assembly 20 by a chain and sprocket connection 34. The last mentioned chain and sprocket connection includes a relatively large sprocket 36 which constitutes, in effect, the small base of the frusto-conical cage 14 and is hereinafter referred to as the cage sprocket. The hydraulic cage motor CM is of the reversible type and, thus, it will be appreciated that, upon rotation of this motor in one direction or the other, the cage 14 will rotate in a corresponding direction and at a materially reduced rate of speed.

Sewer rod feed

Figure 6:
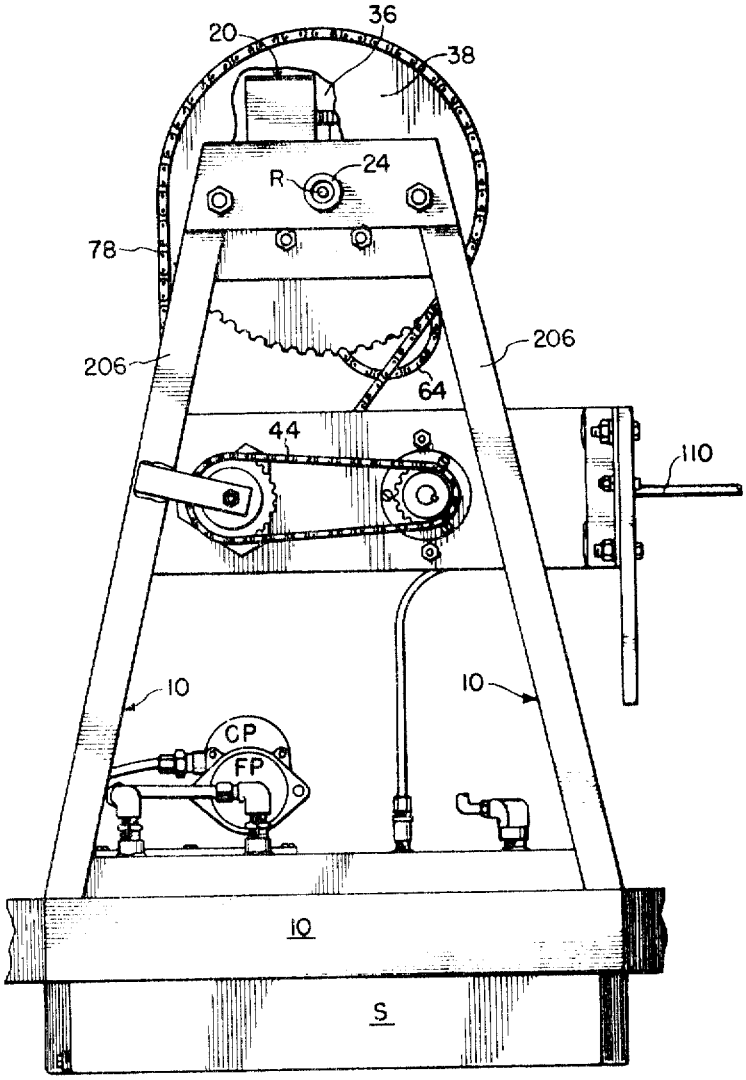
FIG. 6 is a fragmentary front elevational view of the structure of FIG. 1.

Still referring to FIG. 7, sewer rod feed in either direction for paying-out or pulling-in operations, as the case may be, is a function of the differential rotational movements between the aforementioned large cage sprocket 36 and a second large sprocket 38 which is hereinafter referred to as the feed sprocket. Two differential mechanisms are involved, and these are, namely, the aforementioned rotatable differential traction head assembly 20 and a secondary differential unit 40. As will become clear presently, when the two sprockets 36 and 38 rotate in the same direction in unison and at the same rate of speed, no sewer rod feed in either direction will occur. When the feed sprocket 38 rotates with a counterclockwise differential with respect to the cage sprocket 36 (as viewed when looking directly at the machine from the forward end thereof, i.e., as seen in FIG. 6), forward rod feed will obtain at a rate commensurate with the amount of the involved effective differential action. Conversely, when the feed sprocket 38 rotates with a clockwise differential with respect to the cage sprocket 36, reverse rod feed will obtain.

The involved differential movements resolve themselves into a direct function of the speed of rotation of a second or feed motor FM (see FIG. 7). Such motor is of the reversible hydraulic type and is connected to a second horizontal jack shaft 42 by a chain and sprocket connection 44. As will be described in greater detail presently, the second jack shaft 42 is positioned in coaxial relation with the jack shaft 32 and it constitutes one input element of the secondary differential unit 40 while said jack shaft 32 constitutes the other input element thereof.

Figure 4:
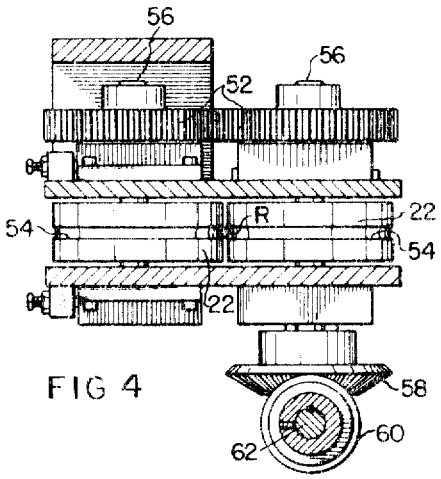
FIG. 4 is a vertical sectional view taken on the line 4—4 of FIG. 3.
Figure 5:
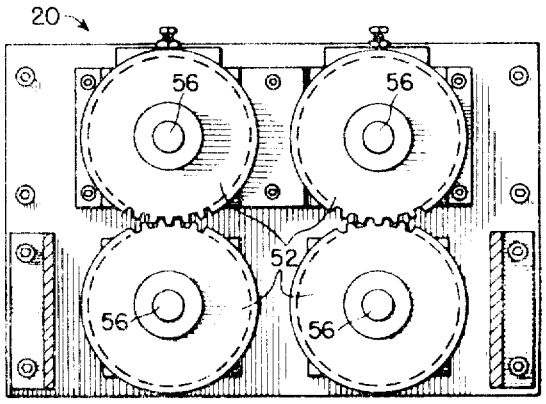
FIG. 5 is a horizontal sectional view taken on the line 5—5 of FIG. 3.

The differential traction head assembly 20, includes a rotary, horizontally elongated, box-like housing 50 (see FIGS. 3, 4 and 5) within which the aforementioned two pairs of feed wheels 22 are rotatable. The feed wheels of each pair are geared together for rotation in opposite direction by means of respective pairs of mating gears 52. Each feed wheel is provided with a continuous peripheral groove 54 within which the sewer rod R seats, the spacing between the grooves of each pair being such that an adequate degree of tractional pressure is exerted upon the rod to impel the same without slipping when the wheels are rotated. The feed wheels 22 and the gears 52 are mounted on common paired shafts 56 (see FIGS. 5 and 7), one shaft of each pair carrying a large bevel gear 58 which meshes with a smaller bevel gear 60 on a horizontal shaft 62, the latter being journalled in the housing 50. Said shaft 62 is operatively connected by a chain and sprocket connection 64 to the feed sprocket 38.

Still referring to FIG. 7, the secondary differential unit 40 includes a rotatable housing 70 in which the adjacent ends of the jack shafts 32 and 42 project are rotatably journalled. The jack shaft 42 carries a bevel gear 72, while the jack shaft 32 carries a bevel gear 74. The two bevel gears 72 and 74 are interconnected by way of two opposed oppositely rotatable idler bevel gears 76 which move bodily with the rotatable housing 70 and extend at right angles to the bevel gears 72 and 74. The housing 70 is connected by a chain and sprocket connection 78 to the large feed sprocket 38.

From the above description, it will be seen that regardless of whether the cage motor CM is in a static condition or whether it is rotating in one direction or the other at any selected speed, if the feed motor is in a static condition there will be no axial movement of the sewer rod R in either direction. Similarly, regardless of whether the feed motor is in a static condition or whether it is rotating in one direction or the other at any selected speed, if the cage motor is in a static condition, there will be no cage rotation. Thus, at all times during the operation of the sewer cleaning machine, the speed of rotation of the cage is a direct function of the speed of rotation of the cage motor CM while the rate of feed of the sewer rod is a direct function of the rate of rotation of the feed motor FM. To illustrate this, if it is assumed that the feed motor FM is in a static condition while the cake motor CM is rotating in one direction or the other, such motion of the cage motor CM will drive the cage directly through the two interconnected chain and sprocket connections 30 and 34 while the consequent rotation of the jack shaft 32 will dissipate itself without function in the secondary differential unit 40 by reason of the fact that the input bevel gear 72 is stationary so that the housing 70 of the secondary differential unit 40 will rotate and transmit its motion through the chain and sprocket connection 78 to the large feed sprocket 38. The diameters of the various sprockets and the number of teeth thereon are so designed according to engineering expediences that, with the bevel gear 72 held stationary by reason of the static condition of the feed motor FM, the power train in the form of the chain and sprocket connections 30 and 34 and the power train in the form of the elements 30, 32, 74, 76, 72, 42 and 78 will drive the two sprockets 36 and 38, respectively, at precisely the same rate of speed and in the same direction so that no feed of the rod R will take place.

Considering now the differential effect of an added rotation of the feed motor FM, while the cage motor CM is rotating in one direction or the other as described above, such added rotation of the feed motor will cause rotation of the differential gear 72 in a corresponding direction. Such rotation of the gear 72 will not affect or alter the direct drive between the cage motor CM and the large cage sprocket 36 which at all times is prevalent through the aforementioned power train in the form of the chain and sprocket assemblies 30 and 34, but it will affect the rate of rotation of the large feed sprocket 38 relative to the cage sprocket 36. The sprocket 38 now will operate under the influence of a differential power train passing through the secondary differential unit 40. This power train extends from the motor FM and includes the chain and sprocket connection 44, the jack shaft 42, the gears 72, 76, the housing 70, and the chain and sprocket connection 78. The arrangement is such that rotation of the sprocket 36 will be proportional to the algebraic sum of the rotational rates of the shafts 32 and 42.

An important feature of the present invention resides in the fact that the compound differential arrangement just described enables a conventional decimal counter unit such as is shown at 80 in FIGS. 1 and 7 to be connected to the jack shaft 42 so that it will indicate in feet or other unit of measurement the precise distance which the rod R has been projected forwardly from the throat 24 at any given moment during the operation of the machine. It is merely necessary to select appropriate diameters for the input bevel gear 72, the sprockets of the chain and sprocket connections 78 and 64, the gears 58 and 60, and the feed wheels 22 so that each rotation of the jack shaft will represent one-tenth of a foot of travel of the rod R in either direction.

Summary

Returning now momentarily to a discussion of cage rotation, it has previously been pointed out how the rate of cage rotation is at all times a function of the rate of rotation of the cage motor CM. If the feed motor FM is stationary, rotation of the jack shaft 32 incident to cage rotation is dissipated in the secondary differential unit 40 without function, the rotating housing 70 serving to drive the large feed gear 38 at the same rate of speed as the rate of speed of the large cage gear 36. If the feed motor FM is rotating in either direction, the previously described differential power train extends to the large feed sprockets 38 from the motor FM to change its relative rate of rotation with respect to the rate of rotation of the large cage gear 36 but this in no way affects disspitation of the motor of the jack shaft 32 in the differential unit 40 and the cage 14 continues to be driven at whatever rate of speed is dictated by the cage motor CM.

To summarize the compound differential action of the differential traction head assembly 20 and the secondary differential unit 40, a straight or direct drive exists at all times between the cage motor CM and the cage 14. The rotational movements of the cage 14 are fed into the differential fraction head assembly 20 through the housing 50 thereof and they also are fed into the secondary differential unit 40 through the jack shaft 32. Rotational movements of the feed motor are fed into said secondary differential unit through the jack shaft 42 and the output of the secondary differential unit 40 is represented by the rotation of the housing 70. This output is fed into the differential traction head assembly 20 by the large feed sprocket 38. The output of the differential traction head assembly 20 is represented by the feed wheels 22 which drive the sewer rod R. When the two inputs to the differential traction head assembly are of equal magnitude and in the same direction, both are dissipated in said differential traction head assembly and the output thereof is zero so that there will be no rod feed. A change in speed of either input with respect to the other will effect a movement of the sewer rod R in either direction, depending upon the direction of relative rotation. A change in cage speed, unaccompanied by a corresponding change in the speed of the feed motor FM will not affect the rate of feed of the rod R by reason of the fact that such change in cage speed is also delivered through the secondary differential unit 40 to the primary differential traction head assembly 20 as an input to the latter. Whatever may be the speed of rotation of the cage 14 and its large sprocket 36, the same will be the the speed of rotation of the large feed sprocket 38 provided that the feed motor FM is not in operation. Similarly, whatever may be the rate of relative rotation between the cage and the large feed sprocket 38, this rate will remain constant providing the rate of rotation of the feed motor FM is not altered. Thus, since the rate of relative rotation between the cage 14 and the feed sprocket 38 determines the rate of linear feed of the sewer rod R, a speed control for each of the two motors FM and CM is all that is necessary to enable an operator to alter the rate of feed of the rod and its rate of rotation, each independently of the other. Such a control in the form of novel hydraulic mechanism, subsequently to be described, is provided according to the present invention.

HYDRAULIC CONTROL MECHANISM

Figure 8:
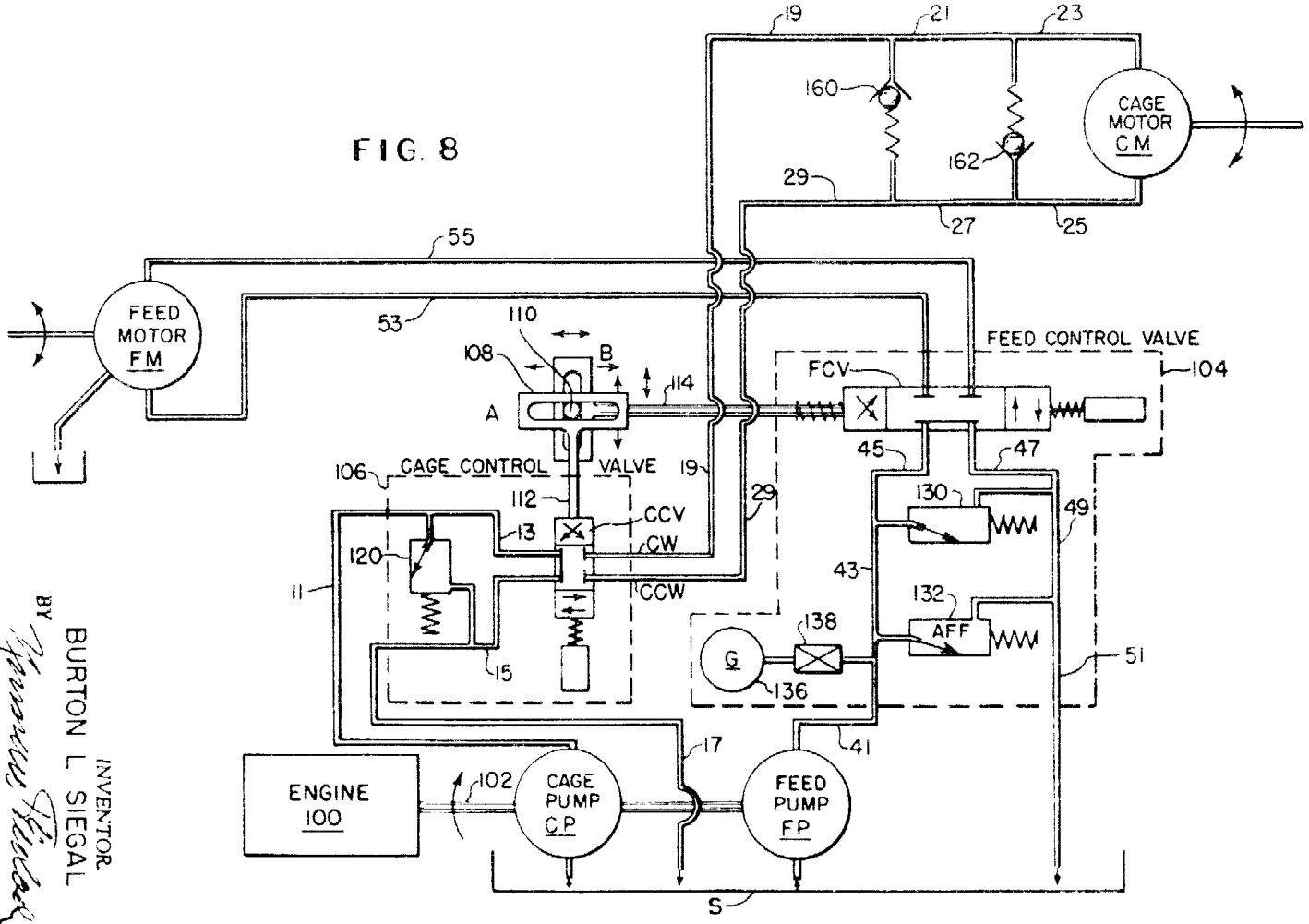
FIG. 8 is a hydraulic circuit diagram illustrating the hydraulic control mechanism by means of which the power trains and differential mechanisms of FIG. 7 are selectively operated.

The hydraulic control mechanism for selectively regulating the speed of rotation of the two hydraulic motors FM and CM is schematically illustrated in FIG. 8 wherein the feed motor FM is shown as being operatively connected for fluid actuation to a feed pump FP through a feed control valve FCV, while the cage motor CM is similarly shown as being connected for fluid actuation to a cage pump CP through a cage control valve CCV. The two pumps CP and FP are driven in common from an internal combustion engine 100 having a drive shaft 102 to which the pump rotors are connected. A sump S which is common to the two pumps CP and FP also services the two valves CCV and FCV. The feed control valve FCV is associated with and constitutes an element of a set of hydraulic feed control instrumentalities which, in FIG. 8, are indicated in their entirety by a dotted line enclosure 104. The cage control valve CCV is associated with and constitutes an element of a set of hydraulic cage control instrumentalities which, similarly, are enclosed by a dotted line rectangle 106. The two valves FCV and CCV are jointly operable under the control of a dual Scotch yoke arrangement 108 including a single operating lever 110 (see FIG. 2) which, when moved or swung in a vertical plane, i.e., raised or lowered, actuates a control stem 112 for the cage control valve CCV, and when moved or swung in a horizontal plane, i.e., shifted from side to side, actuates a control stem 114 for the feed control valve FCV, all in a manner and for a purpose that will be made clear presently. The operating lever 110 is capable of being disposed in an infinite number of positions embodying various increments of either vertical or horizontal displacement from its normal central position and, as previously indicated, such increments of displacement as involve a forward or rearward motion of the sewer rod R will in no way affect the increments of lateral or horizontal displacement of the lever which involve the rate of rotation of the cage 14. The reverse also is true and, therefore, any given position of the operating lever 110 which causes the same to lie in a plane other than either the vertical plane or the horizontal plane indicated by the intersecting dotted lines of FIG. 9 will involve both feed and rotation, however slight, of the sewer rod R.

Cage and rod rotation

Still referring to FIG. 8, the cage control valve CCV has associated therewith an adjustable pressure relief valve 120 which may be set for fluid bypass of the valve CCV when the pressure of fluid in the circuit for the pump CP exceeds a predetermined maximum, thus avoiding damage to the equipment in the event that the cage, during rotation thereof, encounters an obstruction.

Considering now that the operating lever 110 is at its neutral or inoperative position as shown in FIG. 8, and that the engine 100 is running at an optimum operating speed, both pumps CP and FP will be energized and a continuous fluid circuit will extend from the pump CP, through lines 11 and 13, the valve CCV, and lines 15 and 17 back to the sump S. No fluid will flow to the motor CM and, therefore, this motor will remain stationary and no power will be supplied to the large cage sprocket 36 through the power trains in the form of the chain and sprocket connections 30 and 34 (FIG. 7).

In order to cause cage rotation in a clockwise direction as viewed from the rear of the cage, i.e., in a direction looking forwardly and directly into the sewer pipe undergoing treatment, it is merely necessary for the operator to raise the operating lever 110 to a height calculated to attain the desired rate of cage rotation, at which time the valve stem 112 will be extended from the valve CCV and a continuous fluid circuit will be established leading from the pump CP, through the lines 11 and 13, the valve CCV, lines 19, 21 and 23, the cage motor CM, lines 25, 27 and 29, the valve CCV, and the lines 15 and 17 back to the sump S. Rotation of the motor CM will cause rotation of the cage 14 through the previously described chain and sprocket connections 30 and 34 (see FIG. 6). Since there is no lateral displacement of the operating lever 110, the valve stem 114 of the valve FCV will remain undisturbed and the feed motor FM will remain stationary so that there will be no forward or reverse sewer rod feed. However, if, on the other hand, there should be a lateral displacement of the operating lever 110 at the time it is raised, the chain and sprocket connections 30 and 34 from the cage motor CM to the cage sprocket 36 will not be affected and the cage will continue to be rotated at a rate of speed commensurate with the component of vertical displacement that is involved in the particular position of the operating lever 110.

Reverse rotation of the cage 14 is effected by lowering the operating lever 110 below the neutral horizontal plane thereof, the control circuit for reverse rotation of the cage motor CM extending from the pump CP, through the lines 11 and 13, the valve CCV, the lines 29, 27 and 25, the motor CM, the lines 23, 21 and 19, the valve CCV and the lines 15 and 17 back to the sump S.

Sewer rod feed

The feed control valve FCV has associated therewith a fixed pressure relief valve 130 and also an adjustable pressure relief valve 132. The valve 130 is a safety valve and determines the overload pressure in the feed pump line, while the valve 132 is capable of being manually set in order to accommodate different optimum maximum pressures which are to be employed, for example, when feeding the sewer rod R forwardly during paying out operations or when pulling the rod back under tension during actual sewer cleaning operations. In actual practice for forward rod-feeding operations with a boring tool on the leading end of the rod, the valve 132 may be set for a pressure of about 500 pounds in order to prevent buckling of the rod when an obstruction is encountered. During rod-pulling operations, the valve 132 may be set for about 1,500 pounds. A control knob 134 (see FIG. 2) may be provided to facilitate setting of the valve 132 and a pressure gauge 136 and surge stabilizer 138 may be employed to give a visual reading of the pressure of fluid in the feed pump circuit.

Considering again that the operating lever 110 is at its neutral or inoperative position with the engine running at a normal operating speed so that the feed pump FP is in operation, a continuous fluid circuit will extend from the pump FP through lines 41, 43 and 45, the valve FCV, and lines 47, 49 and 51 back to the sump S. No fluid will flow to the motor FM and, as a consequence, the jack shaft 42 will remain stationary so that there will be no input feed into the secondary differential unit 40 (see FIG. 7). With the cage motor CM also stationary, the entire chain and sprocket system, and consequently, the entire differential gear system will remain motionless and there will be neither cage rotation nor rod feed. On the other hand, if the operating lever 110 is vertically displaced from its normal horizontal plane, there will be a corresponding rotation of the cage motor CM. However, with the operating lever lying in its normal vertical plane, there will be no displacement of the valve stem 114 and no rotation of the feed motor FM so that the jack shaft 42 will remain stationary and there will be no input feed into the secondary differential unit 40 (see FIG. 7) to destroy the normal and previously described rotation-in-unison of the cage sprocket 36 and the feed sprocket 38. Thus, there will be no feed of the sewer rod R in either direction.

Figure 9:
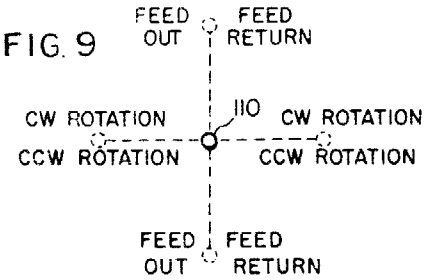
FIG. 9 is a schematic diagram showing the possible positions of the operating lever that is employed in connection with the present invention and indicating the machine functions resulting from such positions.

In order to cause forward rod feed, it is merely necessary for the operator to displace the operating lever 110 to the left as viewed in FIGS. 8 and 9 in order to shift the valve stem 114 correspondingly, the degree of displacement being a function of the desired rate of travel of the rod R. A continuous fluid circuit will then be established from the feed pump FP through the lines 41, 43 and 45, the valve FCV, line 53, the feed motor FM, line 55, the valve FCV, and the lines 47, 49 and 51 back to the sump S. Rotation of the feed motor FM will cause rotation of the jack shaft 42 (see FIG. 7) and a consequent input will be applied to the secondary differential unit 40. This differential input will be reflected by a corresponding rotation of the housing 70 of the secondary differential unit 40 and a consequent turning movement of the large feed sprocket 38. If the cage motor CM is stationary, the differential input will be transmitted solely to the large feed sprocket 38 since the jack shaft 32, and consequently, the cage sprocket 36, are stationary. On the other hand, if the cage is rotating and the operating lever 110 is vertically displaced from its normal horizontal plane at the time it is shifted laterally as previously described for rod-feeding purposes, the differential input that is occasioned by rotation of the jack shaft 42 will be fed into the secondary differential unit 40, which, at that time, is functioning to maintain the two large sprockets 36 and 38 rotating in unison. The added differential input will then change the rate of rotation of the housing 70 and increase the rate of speed of the large feed sprocket 38 with respect to the cage sprocket 36, such increase being a direct function of the rate of turning movement of the jack shaft 42. At this time, the rate of forward movement of the sewer rod R will be accurately reflected by the rate of rotation of the counter 80.

Rearward feeding movement of the sewer rod R is attained by shifting the operating lever 110 to the right as viewed in FIGS. 8 and 9 whereupon a continuous fluid circuit will extend from the feed pump FP through the lines 41, 43 and 45, the valve FCV, the line 55, the feed motor FM, the line 53, the valve FCV, and the lines 47, 49 and 51 back to the sump S. Without describing the specific differential action that is involved, it is apparent that reverse rotation of the feed motor FM will operate to apply a reverse input into the secondary differential unit 40 from the jack shaft 42, this input having the effect to decreasing the relative rate of speed of the feed sprocket 38 with respect to the cage sprocket 36, and thus, destroying the unitary rotation or lack of rotation of these two sprockets which otherwise exists at all times regardless of the extent of vertical displacement or lack of displacement of the operating lever 110 from its normal horizontal plane. In any situation, the rate of travel of the sewer rod R is a direct function of the rate of rotation of the jack shaft 42 so that the decimally calibrated counter 80 will at all times indicate the position of the forward end of the rod with respect to the throat piece 24.

A further advantageous feature of the present invention resides in the provision of an hydraulic dynamic brake mechanism for the cage motor CM. This braking mechanism comprises a pair of spring-loaded pressure relief brake valves 160 and 162 (see FIG. 8) which are arranged in opposite by-pass relationship with respect to the motor CM and in the immediate vicinity thereof. These valves are set for a pressure somewhat higher than the maximum pressure for which the pressure relief valve 130 is set. Thus, at such time as it is desired to terminate rotation of the cage 14, movement of the valve stem 112 to its normal position will close the ports of the valve CCV and the momentum of the relatively heavy rotating cage and its contents will cause the motor CM to operate in the manner of a pump to force fluid through either the brake valve 160 or the brake valve 162, depending upon the direction of rotation of the cage, thus causing rapid deceleration of the motor CM and consequent deceleration of the cage 14.

STRUCTURAL MACHINE ASSEMBLY

The compound differential mechanism which is schematically shown in FIG. 7 and the hydraulic control mechanism therefor as shown in FIG. 8 have been operatively embodied in a commercial sewer cleaning machine, the essential details of which are illustrated in FIGS. 1 to 6, inclusive. All of the mechanical and hydraulic instrumentalities and their component elements which appear schematically in FIGS. 7 and 8 also appear in FIGS. 1 to 6, inclusive, in sufficient detail so that, when considered in the light of the foregoing and following description, a person skilled in the art to which the present invention pertains may readily construct and use a sewer cleaning machine embodying the invention. In the light of what has been previously set forth in connection with the differential traction head assembly 20 and the secondary differential unit 40 wherein all of the essential elements of these two mechanisms were described in detail, no further detailed description thereof is required to support their disclosures in FIGS. 1 to 6, inclusive. Considerable piping appears in FIGS. 1 to 6, inclusive, but the specific disclosed piping arrangement is not essential to the invention and other piping arrangements may readily be devised. Since the fluid lines that are identified by reference numerals and description in connection with FIG. 8 clearly reveal the fluid connections between the pumps CP and FP, the hydraulic motors CM and FM, the valves CCV and FCV and their accessory pressure relief devices, no description of the specific piping of FIGS. 1 and 6, inclusive, has been undertaken herein. The operating lever 110 appears in FIG. 9 and its possible movements and functions have been schematically shown in this view by appropriate labelling so that further description of this control phase of the present invention is not believed to be necessary. In the interest of further clarity, however, a description of certain portions of the machine framework and of certain other illustrated ancillary details will be made herein.

The machine framework 10 involves a generally trapezoidal chassis 200 which tapers at a small angle forwardly and within the confines of which the sump S is supported on the angle pieces 201. Three generally triangular standards 202, 204 and 206 project upwardly above the chassis 200 and, by means of suitable crossbars 208, serve rotatably to support the frusto-conical cage 14, the differential traction head assembly 20, the two aligned jack shafts 32 and 42, and certain auxiliary instrumentalities, such for example, as the counter 80. The chassis 200 is supported by springs (not shown) within an axle housing 210, and a cross member 212 carries a mounting bracket 214 for the pumps FP and CP. A breather cap 216 is provided for the sump S. A side plate 218 extends between the standards 202 and 204 and serves to support the cage control valve CCV. The pressure indicating gauge 136 may be mounted on any appropriate and accessible portion of the machine framework 10 but in the illustrated form of the machine it is shown in FIG. 2 as being carried on a bracket 220 on the standard 206. A vertical oil filter tube 222 extends upwardly from the sump S and appears in FIG. 1.

OPERATION OF THE MACHINE

In the operation of the herein described sewer cleaning machine, due to the many different sizes of sewer pipes and the variety of stoppages which may occur therein, the exigencies of the situations which may arise in connection with such operation will demand different operating procedures. In cleaning a sewer pipe of unknown characteristics, the operator may initially attach a suitable boring head to the forward or leading end of the sewer rod R and then feed the rod forwardly into the sewer pipe with a slow forward movement and a slow rotational movement. This is accomplished by initially starting the engine 100, allowing the same to warm up, and then adjusting the engine to a desirable operating speed, after which the operating lever 110 will be raised slightly and shifted forwardly to a slight extent so that both valves CCV and FCV will admit operating fluid to their respective motors CM and FM in order to initiate the previously described direct drive through the chain and sprocket connections 30 and 34 for rotating the cage 14 in a clockwise direction and also to initiate the previously described compound differential drive through the secondary differential unit 40 so as to increase the speed of rotation of the feed sprocket 38 over that of the cage sprocket 36 and thus establish the desired slow forward feed of the rod R. By thus employing a slow forward speed for the rod R, the operator may become acquainted with the condition of the sewer line and by observing the footage counter 80, he may log the footage at places where difficult stoppages may be expected in future operations on the same sewer line. During such paying-out of the sewer rod R, the adjustable by-pass valve 132 will be set for a relatively low pressure in the feed pump circuit so that a condition of feed motor stall will obtain when a particularly difficult obstruction is encountered. This will enable the operator to manipulate the operating lever to a position wherein the rod R is retracted a slight distance after which it may again be fed forwardly for a second attack on the obstruction.

Reverse rotation of the cage 14 and the rod R will seldom be required but it is made possible by lowering the operating lever 110 to remedy a condition where the boring tool at the forward or leading end of the rod stalls within the obstruction so that the maximum pressure safety valve 120 becomes effective to by-pass the valve CCV. Reverse rotation of the cage 14 and its rod R will serve to unthread the boring tool from the obstruction, so to speak, so that the rod may be retracted and then again advanced for a second attack on the obstruction.

After all obstructions have been cleared and the forward end of the rod R becomes accessible through a remote manhole or other sewer line opening, the boring tool may be removed and a cutter, a brush, or other cleaning tool may be attached thereto, after which the operating lever may be manipulated to a position wherein the direction of rod feed is reversed so that the rod will be fed rearwardly, and thus, progressively returned to the cage 14. During this reverse feed of the rod, a desired rate of clockwise rotation of the cage 14 may be maintained. At this time, the adjustable by-pass valve 132 will be set for a relatively high by-pass pressure inasmuch as the rod R is much stronger in tension than it is in compression and will withstand a pulling force which is several times greater than the maximum pushing force of which it is capable of withstanding.

Occasionally it will be found desirable to feed the rod R rearwardly without rotating the cage 14, as, for example, when a bucket dredge is to be pulled through the sewer line. To accomplish reverse rod feed without rod rotation, the operating lever 110 will be moved to a horizontal position wherein the valve CCV will pass no fluid and then the lever will be shifted rearwardly to an extent commensurate with the desired rate of reverse rod feed. No fluid will then be fed to the hydraulic motor CM, but the valve FCV will admit fluid to the feed motor FM for passage therethrough in a direction to cause the desired reverse rod feed.

Stoppage of both rod feed and rod rotation is accomplished at any time during the operation of the machine without stopping the engine 100. Such termination of all rod movement is accomplished by restoring the operating lever 110 to its neutral position wherein it coincides with the intersection of the vertical and horizontal planes which pass through its point of universal swinging movement. If desired, the operating lever 110 may be spring-biased to such neutral position. Such positioning of the operating lever will cause both valves CCV and FCV to block the fluid lines leading to and from their respective motors CM and FM so that termination of all moving power train sprockets and differential gearing results. Upon such movement of the operating lever 110 to its neutral position, the momentum of the cage 14 actuates the motor CM in the manner of a pump. Thus, with the fluid circuit for the motor CM blocked by the valve CCV, one or the other of the brake valves 160 and 162 becomes effective to establish a powerful retardation of fluid flow in the local circuit passing through the brake valve and the motor CM. The rotation of the cage 14 is thus rapidly terminated.

The invention is not to be limited to the exact arrangement of parts shown in the accompanying drawings or described in this specification as various changes in the details of construction and in the location of parts may be resorted to without departing from the spirit or scope of the invention. For example, whereas the present hydraulically-operable machine has been illustrated and described as being applicable to the reversible feed of a sewer rod, it is within the scope of the invention to employ the same, with such modifications of structure as may be required, for propelling a wire-laying rod, such as is used by telephone and other public utility companies, through a conduit.

Having thus described the invention what I claim as new and desire to secure by Letters Patent is:

1. In a sewer cleaning machine for selectively feeding a continuous elongated sewer rod in opposite directions to and from a sewer pipe or the like, in combination, a rod-storage cage adapted to receive the rod in a coiled condition, having a forward feed aperture for the rod, and rotatable about a horizontal axis passing through the feed aperture, a dual-input differential traction drive unit positioned forwardly of the [basket] *cage* and including a pair of cooperating oppositely rotatable feed wheels the peripheries of which are engageable under pressure with the rod on opposite sides thereof for impelling the rod horizontally and axially to and from the feed aperture, said drive unit being mounted for side-over-side rotation bodily about the horizontal axis of movement of the rod whereby the feed wheels are constrained to revolve in orbital fashion about the rod, said feed wheels constituting the differential output of said drive unit, a cage motor for effecting rotation of said cage, a feed motor for effecting fore-and-aft feeding movements of the sewer rod, said cage constituting a first differential input for said drive unit, a rotatable element constituting the second differential input for said drive unit, a secondary dual-input differential unit including first and second differential inputs and a differential output, a first power train operatively connecting said cage motor and cage, a second power train operatively connecting said cage motor and first differential input of the secondary differential unit, a third power train operatively connecting said feed motor and second differential input of the secondary differential unit, and a [third] *fourth* power train operatively connecting the differential output of the secondary differential unit and the rotatable element which constitutes the second differential input of the drive unit.

2. A sewer cleaning machine according to claim 1 and wherein at least one of said motors is reversible.

3. A sewer cleaning machine according to claim 1 and wherein each of said motors is reversible.

4. A sewer cleaning machine as set forth in claim 3 and wherein the differential effect of said drive unit is such that when the input speed of said cage and rotatable element are equal and unidirectional, said feed wheels remain motionless with respect to the cage so that they are devoid of impelling force.

5. A sewer cleaning machine as set forth in claim 4 and including, additionally, a counter for measuring and indicating the linear extent of projection of the sewer rod from said feed aperture and operatively connected to the second differential input of the secondary differential unit.

6. A sewer cleaning machine according to claim 1 and wherein each of said motors is in the form of a hydraulic motor, and including, additionally, a pump for each motor for supplying motive fluid thereto, an engine connected in driving relationship to said pumps, a [feed] control valve for regulating the flow of fluid from each pump to its respective motor.

7. A sewer cleaning machine as set forth in claim 6 and including, additionally, a single operating lever common to said valves and effective when moved in one direction to increase the flow of fluid from one of said pumps to its associated motor, and effective when moved in a different direction to increase the flow of fluid from the other pump to its associated motor.

8. A sewer cleaning machine as set forth in claim 6 and wherein each of said motors is reversible, and including, additionally, a single operating lever common to said valves and effective when moved in a first path and in opposite directions to progressively increase the flow of fluid from one of said pumps to its associated motor in opposite directions respectively, and when moved in a second path in opposite directions to progressively increase the flow of fluid from the other pump to its associated motor in opposite directions respectively.

9. A sewer cleaning machine as set forth in claim 8 and including, additionally, an adjustable pressure relief valve disposed in by-pass relationship with respect to said feed control valve.

10. A sewer cleaning machine as set forth in claim 9 and including, additionally, a pair of spring-loaded pressure relief braking valves disposed in by-pass relationship with respect to said cage motor, said braking valves being spring-loaded in opposite directions.

References Cited

The following references, cited by the Examiner, are of record in the patented file of this patent or the original patent.

UNITED STATES PATENTS

| | | |
|---|---|---|
| 3,176,335 | 4/1965 | Ciaccio et al. |
| 3,293,681 | 12/1966 | Siegal. |

EDWARD L. ROBERTS, Primary Examiner

U.S. Cl. X.R.

242—54